United States Patent [19]

Hedges

[11] 4,297,628

[45] Oct. 27, 1981

[54] ENERGY ECONOMIZER FOR INDUCTION MOTORS

[75] Inventor: Rhey W. Hedges, Ft. Lauderdale, Fla.

[73] Assignee: Louis W. Parker, Fort Lauderdale, Fla.

[21] Appl. No.: 165,574

[22] Filed: Jul. 3, 1980

[51] Int. Cl.³ .......................... H02P 7/36; H02P 1/26
[52] U.S. Cl. .................................. 318/798; 318/778; 318/812
[58] Field of Search ............... 318/778, 798, 799, 800, 318/808, 809, 812

[56] References Cited

U.S. PATENT DOCUMENTS

| | | | |
|---|---|---|---|
| 3,443,188 | 5/1969 | Mortimer | 318/809 X |
| 3,619,750 | 11/1971 | Mokrytzki | 318/798 |
| 3,813,589 | 5/1974 | Boice | 318/798 |
| 4,041,361 | 8/1977 | Cornell | 318/808 X |
| 4,172,991 | 10/1979 | Akamatsu et al. | 318/798 X |
| 4,176,307 | 11/1979 | Parker | 318/798 |
| 4,190,793 | 2/1980 | Parker et al. | 318/800 |
| 4,215,305 | 7/1980 | D'Atre et al. | 318/808 X |

FOREIGN PATENT DOCUMENTS 2738249 3/1979 Fed. Rep. of Germany ...... 318/778

Primary Examiner—J. V. Truhe
Assistant Examiner—Richard M. Moose
Attorney, Agent, or Firm—Pollock, Vande Sande & Priddy

[57] ABSTRACT

A standard, unmodified AC induction motor has its stator winding energized from a sine wave source through a signal-responsive wave modifier operative to control the portion of each cycle of the sine wave which is coupled from said source to the stator winding. A motor current demodulator, responsive to efficiency-related parameters of the inrush current to the stator winding each time the current in the stator winding increases from zero, produces a control signal for the wave modifier, which signal varies with a decrease in motor operating efficiency below the maximum inherent efficiency of the motor to increase the field density of the stator winding in response to increases in motor load and to decrease said stator field density in response to decreases in said load and/or to maintain the most energy-efficient stator field density at rated motor loads when the voltage magnitude of the sine wave source increases or decreases from its nominally rated magnitude.

37 Claims, 6 Drawing Figures

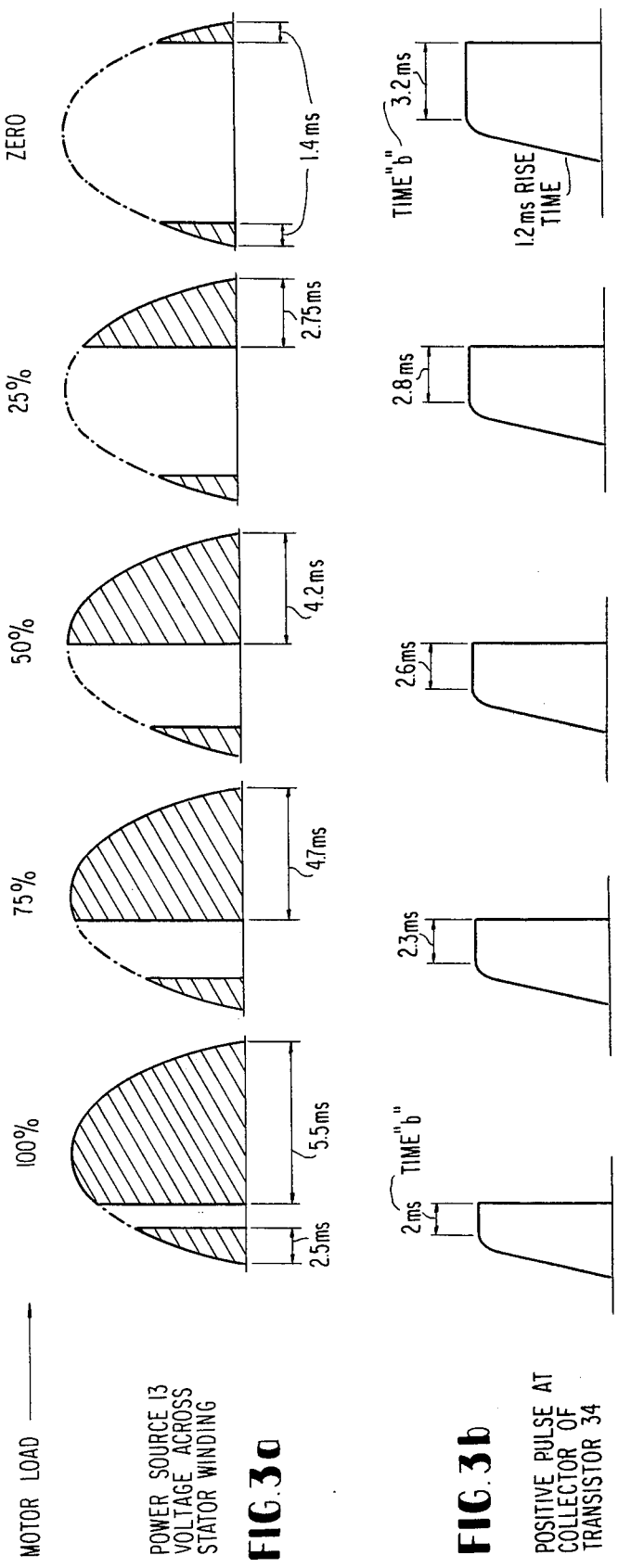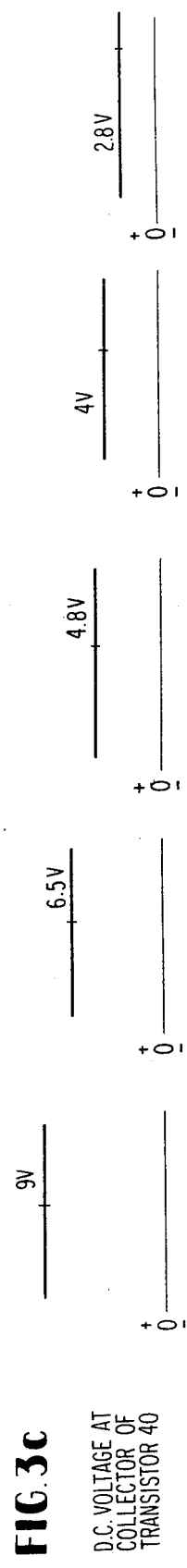

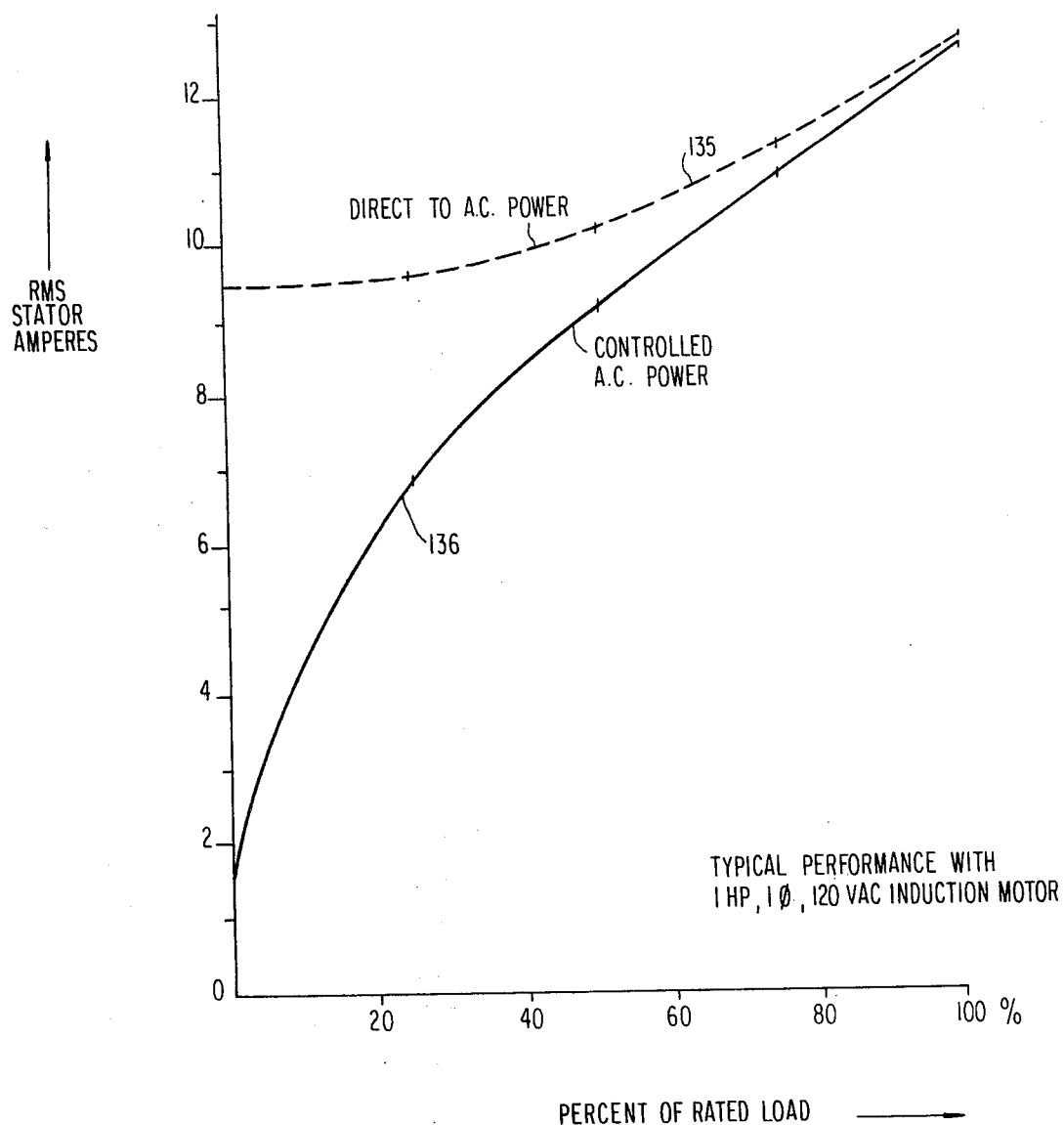

ENERGY ECONOMIZER FOR INDUCTION MOTORS

BACKGROUND OF THE INVENTION

The present invention comprises an improvement in the energy economizing AC power control system described in Parker and Hedges, U.S. Pat. No. 4,190,793 issued Feb. 26, 1980, the disclosure of which is incorporated herein by reference.

Conventional induction motors maintain the full sine wave of voltage across the stator winding regardless of the load on the motor. In those cases where the load varies within wide limits, e.g., when the motor is used for hoisting operations, most of the time the motor is not expending its full rated load. In such cases, the iron losses in the stator are substantially the same when the motor is operating below full rated load as is the case when the motor is operating at full rated load; and, due to the low power factor in such cases, the stator current is high and the copper losses are also substantial. Moreover, the efficiency with which a motor converts electrical energy to mechanical energy is also a function of the magnitude of source voltage applied to the stator winding. It is well-known that maximum inherent motor efficiency is achieved only when a particular relationship is realized between applied stator voltage and the rotor load of a moment. Therefore, when the AC power source voltage rises above or sags below about ten percent of its nominally rated value, a common event when said source is distributed over power lines throughout a community from a central power generating utility, motor operating efficiency will decrease proportionately in such instances even when the rotor load is constant.

When a conventional induction motor is operating below its full rated load or under conditions of higher than nominal stator voltage, a fraction of the sine wave voltage would satisfy the actual load requirement imposed on the motor. Such cutting in part of the sine wave voltage would result in considerably less iron and copper losses and less heating of the stator. The resultant low operating temperature further reduces the copper losses in the motor due to lowered ohmic resistance. These factors combine to effect a significant reduction in the energy which is consumed by the induction motor, with a consequent conservation in available energy sources and a reduction in motor operating costs.

The aforementioned Parker et al U.S. Pat. No. 4,190,793, as well as the present invention, is based upon a recognition of the foregoing factors, and each invention provides a simple yet reliable mechanism operative to cause the electrical energy supplied to the stator and the stator flux density of a standard-unmodified-AC induction motor to become a function of its load demand at any given moment. The present invention accomplishes this by permitting a greater or smaller portion of the sine wave of voltage from a power source to enter the stator as a function of operating efficiency-related characteristics of stator inrush current during each alternation. In other words, the sine wave of the voltage supplied to the motor's stator is modified to suit existing load and AC power source conditions. This results in the reduction of iron and copper losses.

The system described in the aforementioned Parker et al patent employs the speed incidentally achieved by an induction motor when operating with maximum efficiency at zero mechanical load as a particular reference by which motor operating efficiency and the presence and magnitude of a subsequently applied load could be determined. More particularly, in the prior Parker et al system a small induction generator was used to develop a frequency modulated signal which was representative of motor speed and mechanical load at any moment. Specifically, said generator produced an AC signal that was electro-mechanically frequency shift modulated at a 120 Hz rate in proportion to applied loads above zero load, thereby to function as a sensitive load detection means. This prior arrangement has two disadvantages, however, i.e., the need (1) to provide and (2) to mechanically couple an induction generator into the system in such a manner that it is capable of responding to motor rotor shaft movements. In the embodiment disclosed in the said Parker et al patent, a separate-signal load detection means is employed, comprising a small induction generator that is mechanically attached to the rotor of the motor being controlled. Employing optical or other mechanical means for motor shaft speed-change measurements would change the specific nature of, but not overcome, those twin disadvantages.

The present invention is characterized by the provision of an improved induction motor efficiency monitoring and load detection means in a system of the general type described in the said Parker et al patent, which overcomes both of the disadvantages noted above. As will be described, the present invention does not require separate generation of a load-modulated and/or speed-related signal and therefore eliminates the need to provide or couple a separate signal generating means of any kind to the motor rotor.

SUMMARY OF THE INVENTION

In accordance with the present invention, a standard AC induction motor has its stator winding energized from a sine wave power source through a wave modifier operative to vary the portion of each cycle of said sine wave which is coupled from the source to the stator winding. The wave modifier is responsive to a DC voltage whose particular magnitude is controlled by an electronic motor operating efficiency monitoring circuit that functions as part of a conditionally operative nonlinear closed loop positive feedback means, and which causes said DC voltage to become a DC control signal that varies in accordance with load and/or efficiency-related stator input current variations that are naturally produced by the inherent electro-mechanical properties of induction motors.

The load detection circuit employed in the present invention comprises a stator current demodulating circuit that, above about 95% of synchronous motor speed, responds to particular characteristics of stator input current that, during the first few hundred microseconds after current zero crossings, are proportional to the efficiency with which the motor is converting electrical energy to mechanical energy. The characteristics of major significance are the rise time and magnitude of stator inrush current at the beginning of each current alternation, and the instantaneous phase or time of occurrence of stator inrush current. Said inrush current variations and phase of stator inrush current comprise parameters that vary in separate but particular ways in accordance with the operating efficiency of a motor at any given moment, and, in effect, comprise two distinct forms of efficiency-related stator current modulation which, when jointly demodulated, combine to form a resultant signal that can be employed as a reliable indication of said operating efficiency.

The aforementioned efficiency monitoring circuit may be magnetically coupled to either one of the input power lines of a single phase stator winding and may be located physically near or remote from the controlled motor. The output of the said circuit consists of a DC voltage whose magnitude becomes load proportionally controlling of the wave modifier if the power source provides (rated) nominal voltage and the load applied to a running motor varies between zero and maximum rated load, or if the power source provides higher than nominal voltage, a condition which, if uncontrolled, would cause a decrease in the efficiency of a running motor at any load condition, including moderate overloads.

In other words, the DC voltage output of the efficiency monitoring circuit employed in the present invention automatically becomes a DC control signal that acts upon and through the wave modifier thereby to control the application of partial or complete sine waves of voltage to the motor stator under any combination of load between zero and maximum rating and applied source voltage that would otherwise cause the conversion of electrical energy to mechanical energy to occur at less than the maximum inherent efficiency peculiar to said motor. Demodulation of said efficiency-related modulation of stator inrush current to control signal pulses may be accomplished by a pulse amplifier circuit arrangement with particular nonlinear characteristics. Conversion of said demodulated inrush current to said DC control signal may be accomplished by AC coupling the output of said pulse amplifier to a signal biased DC amplifier that becomes controlling operative at a particular most energy-efficient inrush current modulation resultant peculiar to a motor. Thereafter, by reference to said particular resultant, said DC amplifier operates to reduce the magnitude of said DC control voltage when said modulation resultant is indicative of overpowered operation, and operates to increase the magnitude of said DC control voltage when said modulation resultant is indicative of underpowered operation. In other words, the magnitude of input power coupled to the motor from a sine wave power source is controlled by the motor operating efficiency at any given moment.

The wave modifier may take the form which will be described hereinafter by reference to FIG. 2 of the drawings, or in the alternative it may take the form shown in FIG. 3 of Parker et al U.S. Pat. No. 4,190,792. With either wave modifier arrangement, the aforementioned DC control signal ultimately controls the closure of a full wave solid state power switch, such as a Triac, that is disposed between the sine wave power source and the motor stator so that the portion of the sine wave which is coupled to the motor stator, and accordingly, the field density of the stator winding varies with the variations in the load on the motor.

BRIEF DESCRIPTION OF THE DRAWINGS

The foregoing objects and advantages, construction and operation of the present invention will become more readily apparent from the following description and accompanying drawings wherein:

FIGS. 3a–3c are a series of waveforms which relate particular aspects of the present invention to source voltage alternations when an induction motor achieves maximum operating efficiency with rotor loads between zero and maximum rating by response to input power control provided by said invention; and FIG. 4 graphically illustrates stator rms input current for a typical induction motor when energized by direct connection to an AC power source and when energized by an input power control system constructed in accordance with the present invention.

DESCRIPTION OF THE PREFERRED EMBODIMENTS

Figure 1:
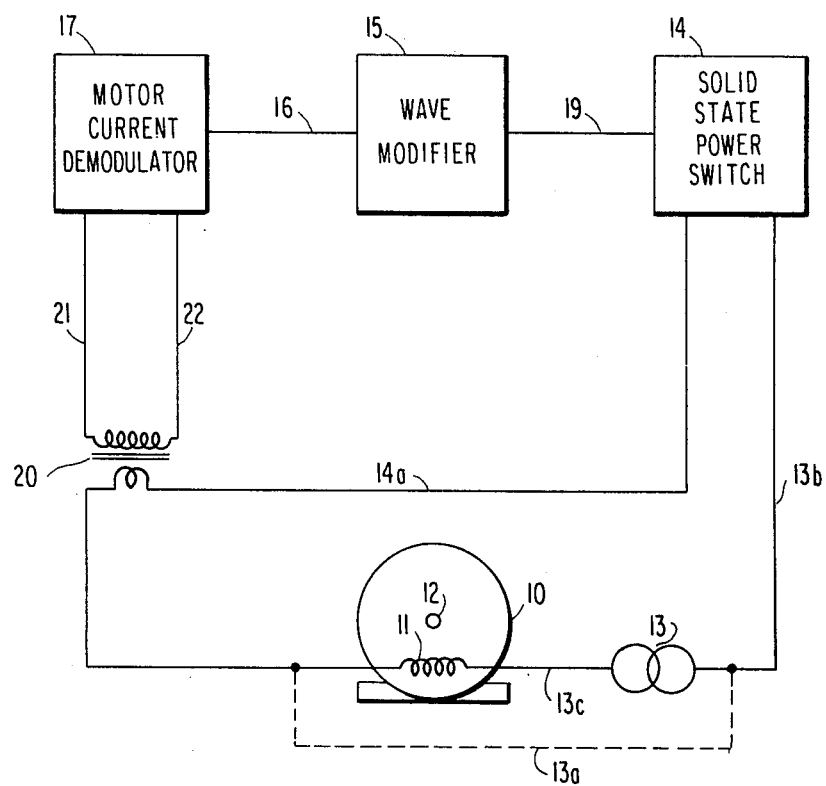
FIG. 1 is a block diagram of a variable field induction motor system constructed in accordance with the present invention.
Figure 2:
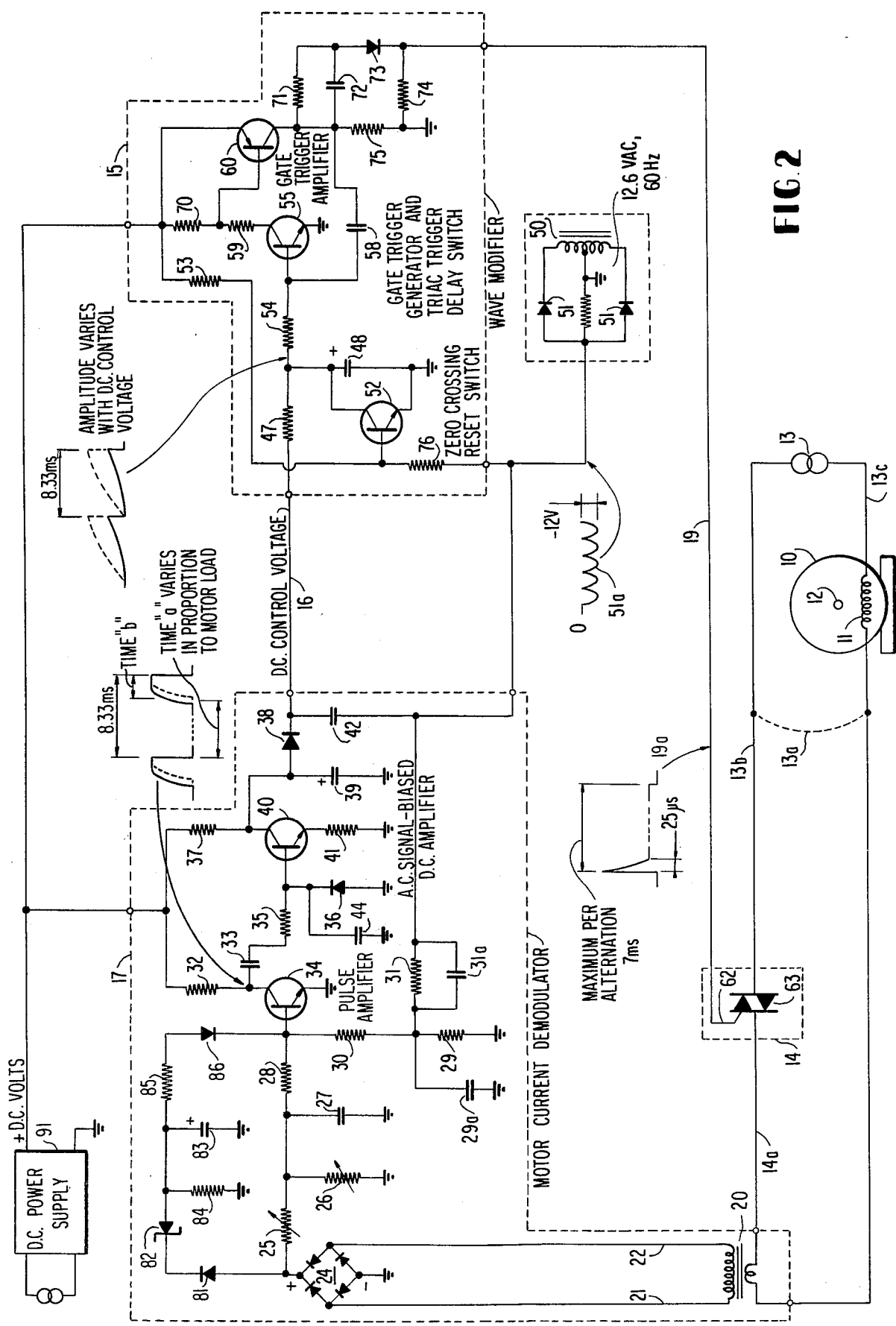
FIG. 2 is a schematic drawing of one embodiment of the motor system shown in FIG. 1.

Referring to FIGS. 1 and 2, like numerals of which refer to like elements, a standard AC induction motor 10 is provided with a stator winding 11 and a rotor having a shaft 12 adapted to be coupled to a load. An AC power source 13 is normally coupled to the stator winding 11, e.g., as shown by solid line 13c and broken line 13a, to energize the stator winding 11 thereby to effect rotation of rotor shaft 12. In accordance with the present invention, this normal energization circuit is interrupted, and power source 13, instead of being coupled directly to stator winding 11, is connected instead, as at 13b, to one side of a solid state power switch 14, the other side of which is connected, e.g., as at 14a, to the stator winding 11 through the primary winding of a saturable core transformer 20. Switch 14 may comprise for example, a Triac assembly, or a silicon controlled rectifier assembly, and, as shown in FIG. 1, switch 14 is regulated by a wave modifier 15. Wave modifier 15 can take the form shown in Parker et al U.S. Pat. No. 4,190,793, or it can comprise a circuit of the type which will be discussed hereinafter in reference to FIG. 2. In either case, the operation of wave modifier 15 is controlled by a DC control voltage appearing on line 16 at the output of a motor current demodulator 17, which control voltage is, under certain conditions, a function of the load on or operating efficiency of motor 10.

More particularly, and as noted above, the primary of saturable core transformer 20 is connected in series with one of the stator input power lines, such as 14a as shown in FIG. 1. A voltage pulse of relatively short duration, derived from stator 11 initial inrush current passing through said primary, is generated across the secondary of transformer 20 each time said inrush current reverses its direction of flow (in other words at current zero crossings) and said voltage pulse is coupled via lines 21 and 22 to a full wave diode bridge 24 (FIG. 2) in motor current demodulator 17. The various individual parameters of said voltage pulses, such as their amplitude, risetime, duration and absolute time of occurrence, vary in proportion to the magnitude and wave form of the applied voltage, the momentary mechanical load on the motor, and the inherent electromechanical properties peculiar to the motor.

Demodulator 17, which will be described in further detail subsequently in reference to FIG. 2, comprises an adjustable circuit which operates to produce a control signal from a particular combination of the aforementioned variable parameters which occur when motor 10 is operating at maximum inherent energy efficiency.

This establishes particular stator inrush current characteristics as an energy-efficiency reference. The closed loop positive feedback of the present invention, of which demodulator 17 is the energy-efficiency controlling portion, subsequently increases or decreases the average input voltage coupled from AC power source 13 by wave modifier 15 to the motor stator as necessary to maintain the particular energy-efficient pulse parameter reference established for said controlled motor by previous adjustment of demodulator 17. Demodulator 17 may be adjusted by variable resistors 25 and 26 (FIG. 2) to produce said efficiency-related control signal in response to the individually peculiar, but generally similar, electro-mechanical properties of various types of standard single phase induction motors, wherefore the present invention is not limited to a single particular motor.

When using the invention and electrical connection is made to power supply 13, the motor will start with full sine wave power and consequently full torque. As near synchronous speed is reached, the power source voltage sine wave becomes modified by the invention to supply only sufficient power to maintain said motor's most efficient operating speed. On a four pole, 60 Hz motor, this speed typically varies between about 1775 and 1747 RPM from zero to full rated load. A steady state condition is reached within a few seconds after power is first applied. If a sudden heavy load is applied, a new efficient speed is reached in about 18 cycles, or roughly ⅓ seconds. Following this, a new steady state condition is maintained at said new speed.

When the motor is running, and demodulator 17 has been adjusted to provide maximum motor efficiency at, for example, zero load, the aforementioned stator inrush current parameter modulation becomes proportional to the magnitude of subsequently applied loads. Thus, said pulse parameter modulation appearing in the secondary of transformer 20 is converted by demodulator 17 to a corresponding magnitude of DC control signal on line 16 that is proportional to subsequent motor efficiency and/or to the particular motor load applied above the energy-efficient zero load reference at all loads between zero and maximum rated motor loads. More particularly, demodulator 17 increases or decreases said DC control signal when said inrush current characteristics indicate decreased operating efficiency due to under or overpowered motor operation regardless of whether said conditions are a result of a change in rotor load or magnitude changes of the sine wave voltage supplied by AC power source 13. In other words, demodulator 17 responds in a controlling sense to a decrease in operating efficiency regardless of the cause of said decrease.

The DC control voltage on line 16 is used to control the operation of wave modifier 15 in the manner which will be more fully described in reference to FIG. 2. For the present, it suffices to note that the DC control voltage on line 16 when coupled to said wave modifier 15, ultimately energizes the gate electrode of a solid state power switch 14 for a predetermined portion of time of each cycle from AC power source 13. The duration of said gate electrode energization during each alternation of power source 13 produced by the wave modifier 15 is a function of the magnitude of the DC control signal on line 16, and due to the operating efficiency reference established near synchronous rotor speeds, said control signal becomes a function of the mechanical load imposed on the motor when power source 13 supplies a steady nominal voltage. When the wave modifier 15 takes the form shown in FIG. 2, the gate electrode energization consists of a short duration high amplitude current pulse followed by a steady DC current, and when the wave modifier takes the form shown in the aforementioned Parker et al patent the gate electrode energization consists of a train of current pulses provided by a gate trigger generator. In either case, the gate electrode energization is coupled to the gate electrode control terminal of solid state power switch 14 to close said switch for a corresponding time portion of each cycle from AC power source 13. As a result, a greater or smaller portion, or even a complete cycle, of each voltage cycle from power source 13 is coupled via connection 14a to stator winding 11 of motor 10, as a function of the load on the motor. When the load increases, therefore, the stator magnetic field density of the motor similarly increases; and, when the load on the motor decreases, the magnetic field density of the stator is decreased.

A preferred circuit operating in the fashion described above is shown in FIG. 2. For purposes of subsequent description, it is assumed that AC induction motor 10 is a single phase induction motor, and the circuit of FIG. 2 shows how the stator flux density can be controlled as a function of the motor load or motor operating efficiency in that single phase. Polyphase motors can be made to operate in similar fashion by connecting motor current demodulator 17 into one of the several phases and coupling the output of demodulator 17 to separate wave modifiers which control the energization of two of the three phases in a three phase motor. An arrangement of this general type, employing two wave modifiers which are responsive to a single motor load detection means to provide load-related control of the AC power in only two of the three phases of a three phase induction motor, is described in my co-pending U.S. patent application Ser. No. 35,974 filed May 4, 1979, now U.S. Pat. No. 4,242,625, for "Energy Economizer For Polyphase Induction Motors."

The operation of the motor current demodulator 17 will now be described more fully. Transformer 20 is provided with a core of magnetic material that saturates at a substantially lesser current magnitude than that which flows through stator 11 when motor 10 operates with maximum efficiency at zero load. The waveform of the voltage developed in the secondary of transformer 20 consists of a relatively short duration pulse each time the stator current increases from zero. Generally speaking, each of the voltage pulses produced in the secondary of transformer 20 at an amplitude of 1 v., has a duration of approximately 500 microseconds in a system constructed in accordance with the present invention. The precise width and other parameters of said voltage pulses at any given stator current zero crossing are proportional to several factors, among which are the magnitude and waveform of the stator inrush current, the magnitude of the motor load, and the efficiency with which motor 10 is converting electrical energy to mechanical energy. In other words, the parameters of the voltage pulses appearing in the secondary of transformer 20 are proportional to the various characteristics of the current flowing in stator 11 which naturally vary in accordance with the waveform of the applied voltage, the motor load and the inherent properties of induction motors. Thus, when demodulator 17 is adjusted to cause motor 10 to operate at maximum possible efficiency, the then existing load-related parameters of said voltage pulses comprise a particular reference that corresponds specifically to that condition of efficiency regardless of the particular magnitude of motor load.

The secondary winding of transformer 20 is connected by lines 21 and 22 to a diode bridge 24 whose negative output terminal is grounded. The output of bridge 24, therefore, consists of positive voltage pulses regardless of the actual flow direction of stator inrush current. The positive output of bridge 24 is coupled through a variable resistor 25 to the junction of a variable resistor 26 and capacitor 27, whose other terminals are grounded, and is coupled via a resistor 28 as forward bias to the base electrode of a pulse amplifier transistor 34 whose emitter is grounded. Said forward bias accumulates on capacitor 27 in accordance with the load and efficiency related parameters of stator initial inrush current and is then discharged through the base and input circuit of transistor 34 during the balance of each alternation of power source 13. The base of transistor 34 is also connected to the output of a transformer 50 which is full wave rectified by diodes 51 and connected via line 51a to said transistor base through a voltage divider consisting of resistors 29, 30 and 31 and capacitors 29a and 31a. As shown by the waveform representation on FIG. 2, the voltage on line 51a consists of negative alternations that correspond to the positive and negative voltage alternations of AC power source 13. As a result of the signal on line 51a, transistor 34 also receives a reverse bias that varies in a particular manner during each power source voltage alternation that is not load related. In other words, transistor 34 is supplied with stator inrush current parameter related forward bias during each power source voltage alternation as developed by bridge 24, and with a reverse bias whose magnitude varies in accordance with the phase of each source voltage alternation.

The conduction of transistor 34, therefore, is a resultant of said two bias inputs and, due to said efficiency-related previous adjustment of demodulator 17, said conduction is indicative of motor operating efficiency at any moment. More specifically, said resultant bias causes transistor 34 to develop positive flat topped pulses which occur at a 120 Hz rate at the junction of resistor 32 and capacitor 33 as shown in the waveform representation on FIG. 2, and, as also indicated in said waveform representation, the width of said pulses varies in accordance only with motor load variations (when power source 13 supplies its nominally rated voltage). FIG. 3b shows typical pulse width variations at various loads.

The collector of pulse amplifier transistor 34 is coupled via a capacitor 33 and a resistor 35 to the base of an AC signal-biased DC amplifier transistor 40 and to the positive side of DC power supply 91 via a resistor 32. This arrangement provides a forward bias to said transistor 40, which forward bias is developed when capacitor 33 charges from ground through the base-emitter junction of transistor 40, resistor 35, and resistor 32 to the positive side of power supply 91. The magnitude of said forward bias varies in proportion to the load magnitude responsive positive pulse width at the collector of transistor 34, and conduction of transistor 40 is thereby caused to be a function of motor load.

The collector of transistor 40 is connected to one side of a capacitor 39, the other side of which is grounded, and is also connected via resistor 37 to the positive side of power supply 91. The emitter of transistor 40 is connected to ground through a resistor 41. Capacitor 39 is charged from power supply 91 through resistor 37 part of the time, i.e., when transistor 40 is nonconducting, and is discharged through transistor 40 and resistor 41 when transistor 40 is rendered conductive. The time constant of the RC circuit 37, 39 is long compared to the 120 Hz rate at which the conduction of transistor 40 varies, and the voltage across capacitor 39 is accordingly a fairly steady DC potential whose magnitude is inversely proportional to the width of the positive pulses developed at the collector of transistor 34 (see FIGS. 3b and 3c). When motor 10 is running above about 95% of synchronous speed, and power source 13 supplies its nominally rated voltage, the pulse widths at the collector of transistor 34 vary inversely only to the magnitude of motor load. Therefore, the voltage across capacitor 39, which comprises the DC control voltage ultimately appearing on line 16, due to inversion by transistor 40, is proportional to motor load, i.e., when the motor load increases, the DC voltage on line 16 increases and vice versa.

The relationship between operating efficiency and the characteristics of the first few hundred microseconds of stator inrush current of a typical induction motor whose stator source voltage consists of switched partial sine waves is not generally well-known. Therefore, the following information is submitted to assist in a more specific understanding of the operation of motor current demodulator 17 which, by design, includes particular nonlinear operation of a pulse amplifier transistor 34 which opposes a power source induced nonlinearity in stator inrush current during each power source alternation.

When an unloaded induction motor is running near synchronous speed with complete sine waves of voltage being applied to the stator, the inductive nature of the motor causes stator current zero crossings to be delayed from source voltage zero crossings by a time proportional to said inductance. Further, the initial inrush current waveform after current zero crossings follows the sine curve of the applied voltage. Therefore, stator inrush current characteristics during the first four to five hundred microseconds after said zero crossings do not vary appreciably between zero and maximum motor load. The information in the previous three sentences is well-known. However, it is not well-known that when the same motor has switched partial rather than complete sine waves of voltage to the stator, the characteristics of stator initial current inrush vary during the first few hundred microseconds in accordance with rotor load, rotor speed and the particular moment after a voltage zero crossing that said partial sine waves are switched on, i.e., the phase of the source voltage at switching. Most significantly, the known prior art does not teach that, when operating at maximum efficiency, the parameters which describe said current characteristics during the first few hundred microseconds are more a function of motor operating efficiency than motor inductance when the source voltage is switching partial instead of continuous sine waves; nor does the known prior art teach that when the highest possible operating efficiency of a motor is maintained while the rotor mechanical load is varied between zero and maximum rating by varying the time after voltage zero crossing that a switched partial sine wave voltage is applied, the change in time delay of stator inrush current compared to power source voltage zero crossings is nearly proportional to said load instead of the motor's inductance. The change in stator inrush current parameters during said load variation, however, is not linear even when the AC power source supplies rated nominal voltage. Since each voltage alternation of the power source is a half sinusoid, said parameters near synchronous speed vary in accordance with both the load magnitude and the particular source voltage magnitude at the precise moment is it switched on to the stator after a voltage zero crossing. Thus, when the stator voltage is a switched, partial sine wave that is increased in time duration in a manner which maintains maximum motor efficiency with varying motor load, said inrush current parameters vary in both a linear and a particular nonlinear manner. More specifically, near synchronous speed, said parameters vary nonlinearly in response to the sine curve of the applied voltage which is not load induced as well as proportionally to rotor mechanical load variations. FIG. 3a illustrates the magnitude (or phase) of source voltage alternations at the time of power control switching at various motor loads.

The foregoing stator inrush current parameter variations produced upon switched application of partial sine waves of power source voltage are a result of induction motor properties. Of particular concern to this invention, said parameters may be observed at the moment of switching to be responsive to:
1. the source voltage phase,
2. the absolute magnitude of the source voltage,
3. the rotor mechanical load magnitude, and
4. the rotor speed.

Most significantly, said parameters assume a particular set of values and relationships in accordance with the motor's operating efficiency at every magnitude of rated motor load. More specifically, when the motor is operating at its maximum possible efficiency, the load-induced magnitude of stator initial inrush current and its time of occurrence compared to source voltage zero crossings are two parameters that vary with motor load but at all moments relate specifically to motor operating efficiency. Said two parameters exhibit a particular magnitude versus time of occurrence relationship when the motor operates with said maximum efficiency at rated loads and, therefore, serve to define said efficiency in said load range. However, the stator inrush current induced (only) by the rotor load of a moment cannot be observed directly because it is essentially obscured by co-existing inrush current which results from said nonlinearity (sine curve) of applied source voltage. Said nonlinearity is obviously not load-related and tends to prevent observation of said efficiency-related inrush current variations, especially at moderate to zero loads.

When the power source supplies its rated nominal voltage and the motor is running near synchronous speed, said combined variations of said parameters may be viewed as complex amplitude and phase modulation produced in response to separate but simultaneous amplitude modulating actions of rotor mechanical load and source voltage nonlinearity as well as phase at the moment said voltage is applied (switched) to the stator winding. With this view, it can be seen that if the sine curve of the source voltage induced amplitude modulation component of said parameters that is not load-related were neutralized (i.e., cancelled) the remaining parameter variations (modulation) near synchronous speed would be proportional to only those which define the motor's operating efficiency at every rotor load, including zero load.

Briefly stated, in the present invention, said efficiency related amplitude and phase modulation of stator inrush current is jointly demodulated during each power source voltage alternation by motor current demodulator 17. More specifically, the arrangement of demodulator 17 includes adjustable circuit means which is responsive to a first voltage developed by said inrush current parameter total variations and a second opposing sine curve voltage derived from said power source that is approximately 180° out of phase with said source voltage phase during each alternation. By said circuit arrangement, said variation induced by the sine curve of the source voltage which is not efficiency or load-related may be cancelled (by adjustment) and the remaining parameter variations are, in effect, a modulation resultant that is proportional to only motor operating efficiency at any subsequent moment or rated motor load.

The load-responsive control of motor current demodulator 17 will now be described in greater detail. Referring again to FIG. 2, assume that power source 13 supplies its rated, nominal source voltage and motor 10 is running near synchronous speed. Assume further that variable resistors 25 and 26 in motor current demodulator 17 have been previously adjusted to provide maximum inherent operating efficiency of motor 10 at, for example, 50% of rated load. Recall from the operating characteristics previously discussed that the output of bridge 24, which comprises the forward bias to transistor 34, results from parameter modulation of stator inrush current induced by the motor load and a particular nonlinearity of the voltage coupled from power source 13 by switching action of solid state switch 14. Thus, a portion of the variation in the magnitude of forward bias coupled to transistor 34 from bridge 24 is not load-related, but is instead an incidental response to the sine curve nonlinearity of the power source alternations. Recall that the reverse bias supplied to transistor 34 by line 51a is derived from rectified alternations of power source 13 and therefore includes a sine curve nonlinearity that is approximately 180° out of phase with the forward bias variations induced by said sine curve nonlinearity of power source 13 voltage. The resultant of said forward and reverse biases coupled to transistor 34 may be adjusted to be proportional only to the parameters of inrush current that correspond to the magnitude of motor load. In other words, the net effect of the opposing sine curve nonlinearities of said bias inputs may be adjusted to cancel during each alternation and the conduction of transistor 34 thereby caused to be essentially proportional to only said load-related parameters of stator inrush current regardless of said power source 13 voltage nonlinearity. Thus, when the motor load increases, the conduction time of transistor 34 increases and vice versa.

Refer now to FIG. 3b which shows the pulses typically produced at the collector of transistor 34 at various motor loads between zero and maximum rating. Note that time "b" of said pulses varies in accordance with motor load regardless of the power source 13 voltage phase (FIG. 3a) at which said voltage is switched to the stator winding. FIG. 3c shows that the DC voltage output at the collector of transistor 40, produced by the pulses coupled to its input from transistor 34, is likewise load-related.

The combined parameters of the voltage pulse output of bridge 24 (developed by stator initial inrush current) charge capacitor 27 through resistor 25 during each alternation of power source 13. Although the width of said pulses is only a few hundred microseconds, the discharge path time constant of capacitor 27 through the base input circuitry of transistor 34 is several milliseconds. Therefore, transistor 34 is conducting during most of each power source alternation, thereby clamping the junction of resistor 32 and capacitor 33 to near ground potential by collector-emitter conduction. Transistor 34 conduction time is identified as time "a" in the related waveform on FIG. 2. During time "a," which varies with the load-responsive variations of stator inrush current, signal-biased DC amplifier transistor 40 is non-conducting since it has no independent source of forward bias. During time "b" of the same waveform (and in FIG. 3b), transistor 34 is non-conducting and forward bias is supplied to transistor 40 by the charging of capacitor 33 to power supply plus through resistor 32 on its one side and with a path to ground through the input circuit to transistor 40 on its other side. Because of the load-responsive variations in the conduction (time "a") of transistor 34, time "b" likewise varies in response to varying motor loads. Thus, the conduction of transistor 40, which is directly responsive to the pulse width "b", is thereby caused to be load-responsive. Resistor 35 and capacitor 44 smooth the forward bias produced by the switching of transistor 34 and the discharge of capacitor 33 through diode 36. Capacitor 42, connected between line 51a and line 16, serves to improve the linearity of the output of demodulator 17 especially near zero load.

For the above reasons, the DC voltage appearing on line 16 is proportional to motor loads between zero and maximum rated load when power source 13 supplies its nominally rated source voltage. Diode 38 prevents capacitor 39 from receiving any charge from the wave modifier circuit 15.

While the invention has been shows above to provide a load-responsive control, it should be recalled that the particular reference basis for adjustment of demodulator 17 was efficiency related rather than load-related. When demodulator 17 is adjusted for maximum possible operating efficiency at any particular load, the actual basis for input power control to the stator is a particular set of stator inrush current parameters that exist when the motor achieves said efficiency. Thus, said parameters are efficiency-related, not load-related. Therefore, if the motor load is constant but the nominal voltage of power source 13 varies, demodulator 17 will vary the DC control voltage on line 16 as necessary to maintain the particular set of stator inrush current parameters which correspond to maximum operating efficiency. In other words, once demodulator 17 is adjusted to cause wave modifier 15 to couple the particular rms input power of partial sine waves that achieves maximum motor operating efficiency at any rated load, demodulator 17 commands wave modifier 15 to increase said input power when the stator inrush current parameters are indicative of underpowered operation (due to increased load or decreased nominal source voltage) and to decrease said input power when said parameters are indicative of overpowered operation (due to decreased load or increasd nominal voltage).

In typical induction motor applications, mechanical load variations are seldom abrupt and severe and an input power control system response time of one or two seconds provides suitable energy-saving performance. However, there are some applications where said load varies abruptly from zero to maximum in milliseconds. In such cases, input power to the stator winding must be increased rapidly to prevent substantial, though momentary, decreases in motor speed. The arrangement of demodulator 17 of FIG. 2 includes additional circuit means 81–86 which accelerate the increase of AC power coupled to the stator winding when a severe load is suddenly applied to the rotor. Said additional circuit does not alter the previously described operation of demodulator 17 in response to said more typical load or AC power source variations. Briefly stated, the additional circuit employs the abruptly increased stator initial inrush current (which results from sudden application of maximum load to a previously zero loaded running motor powered by partial sine waves) to command the coupling of full sine waves of power to the motor by wave modifier 15 within approximately 0.3 seconds after said load increase.

Assume a heavy load is suddenly applied to a motor running near synchronous speed with zero load. The substantially higher amplitude pulses at the output of bridge 24 which charge capacitor 27 are also coupled through diode 81 to zener diode 82. In this example, said heavy load pulses exceed the conduction threshold of zener diode 82 and charge capacitor 83 as well as capacitor 27. This higher voltage charge on capacitor 83 is coupled as additional forward bias to the base electrode of transistor 34 through resistor 85 and diode 86. The discharge time constant of capacitor 83 through resistors 84 and 85, diode 86 and the base input circuit of transistor 34 is selected to be approximately 0.3 seconds. With transistor 34 conducting continuously, transistor 40 receives no forward bias during said discharge time period of capacitor 83. The voltage at the collector of non-conducting transistor 40, which is coupled to line 16 through diode 38 as the DC control voltage to wave modifier 15, increases more rapidly than is the case when transistor 34 is switched off during each alternation, and full sine waves of AC power are thus quickly applied to the motor stator. When full sine waves of power are applied, the motor efficiency is restored and the stator inrush current returns to being in proportion to the heavier load. The voltage pulse output of bridge 24 then falls to an amplitude which is insufficient to charge capacitor 83 through zener diode 82, and the charge on capacitor 27 again controls the conduction of transistor 34. Thus, after quickly responding to the assumed sudden maximum load increase in response to the forward bias circuit means added for this purpose, demodulator 17 operates as before. Sudden load decreases do not activate said added bias circuit means, therefore, and the only change in the operation of demodulator 17 (as previously described) is a substantially faster increase in the coupling of AC power to the motor when required by abrupt load increases.

As noted previously, the wave modifier circuit can be constructed in the manner described in Parker et al U.S. Pat. No. 4,190,793. A different, preferred wave modifier circuit 15 is shown in FIG. 2, and operates as follows:

Transformer 50 whose primary winding may, for example, be coupled to a tap on AC power source 13, supplies a low potential (e.g., 12.6 Vac) 60 cycle voltage to full wave rectifiers 51 connected to its secondary winding. The rectifiers 51 are so poled that their outputs on line 51a are in the negative direction, and these negative-going pulses, in addition to being supplied to transistor 34 as already described, are applied to the base of a transistor 52 comprising a portion of a zero crossing reset switch in wave modifier 15. The negative going pulses thus supplied to transistor 52 keep transistor 52 nonconductive for the majority of each cycle, with this condition being altered only during the zero crossings of the 60 cycle wave.

More particularly, the base of transistor 52, in addition to being supplied with the negative going alternations from rectifiers 51, is supplied with forward bias current through a resistor 53 which is connected to the positive side of DC power supply 91. This forward bias current causes collector-emitter saturation in transistor 52 during zero crossing and, during this time, the junction of resistors 47, 54 and capacitor 48 (i.e., the collector of transistor 52) is clamped to the near ground potential of approximately 0.1 vdc. After the AC source voltage passes through zero, the voltage supplied by rectifiers 51 begins falling toward a negative value of approximately −12 vdc. When the resultant voltage on the base of transistor 52 falls below approximately +0.7 vdc, collector-emitter cutoff occurs. Transistor 52 remains cutoff until the voltage at its base again rises to +0.7 vdc due to the forward bias supplied by resistor 53 and the arrival of the next zero crossing. Thus, transistor 52 is cut off most of the time during each AC power source voltage alternation, and conducts only slightly before, during and slightly after the zero crossings of those alternations. The duration of conduction of transistor 52 is approximately 0.5 ms.

When transistor 52 is conductive, capacitor 48 discharges; when transistor 52 is cut off, a described above, capacitor 48 begins charging through resistor 47 toward the level of the DC control voltage which is supplied by capacitor 39. The resultant signal at the collector of transistor 52 has the waveform shown in FIG. 2, and varies in amplitude with the DC control voltage on line 16.

The resultant signal at the collector of transistor 52 is supplied via resistor 54 to the base of a transistor 55 in the wave modifier circuit 15 to render transistor 55 conductive, but the conduction of transistor 55 is delayed in accordance with the voltage which is actually present on the positive side of capacitor 48. More particularly, transistor 55 remains nonconductive until the voltage across capacitor 48, which is coupled to the base of transistor 55 through resistor 54, reaches approximately +0.7 vdc., whereafter transistor 55 (which constitutes a Triac trigger delay switch in the wave modifier circuit 15) begins to conduct collector-emitter current The collector of transistor 55 is coupled through resistor 59 to a gate drive circuit in the wave modifier circuit, i.e., to the base of pnp transistor 60 which, when conducting, energizes the gate electrode 62 of Triac 63 via line 19. More particularly, when transistor 55 is nonconducting, transistor 60 is held nonconducting by resistor 70 connected between its base-emitter terminals. When transistor 55 is caused to begin conducting collector-emitter current as previously described, a portion of said current is drawn from the power supply 91 through the base-emitter junction of transistor 60 causing transistor 60 to commence turn on. The switching on of transistors 60 and 55 is accelerated by positive feedback from the collector of transistor 60 to the base of transistor 55 via a capacitor 58 which couples the positive going voltage developed across resistor 75 and ground as transistor 60 turns on. The output signal on line 19 takes the form shown in FIG. 2 at 19a, i.e., a high amplitude short duration pulse of approximately 25 microseconds that decays to a steady voltage level for a maximum time of approximately 7 ms per alternation of the AC power source 13, or occurring during such lesser portion of said AC power source cycle as may be determined by the time at which transistor 55 was first rendered conductive during a given alternation of said power source.

After transistor 55 is brought to saturation by the combined action of the forward bias coupled from capacitor 48 and the positive going feedback bias coupled to the base of transistor 55 via capacitor 58 from the collector of transistor 60, transistor 55 is maintained in this state by the forward bias of capacitor 48 for the remainder of the power source voltage alternations. The rapidly rising positive going voltage developed across resistor 75 at the moment of transistor 60 turn on is coupled by capacitor 72, and to a lesser degree by resistor 71, through a protective diode 73 to line 19, and by line 19 to gate electrode 62 of Triac 63 in solid state switch 14. Resistor 74 serves to hold line 19 to a relatively low impedance in the absence of gate energization output by transistor 60 to reduce the likelihood of spurious turn on of Triac 63.

Triac 63 is turned on by the arrival to the short duration high amplitude pulse 19a coupled to its gate through capacitor 72 from the collector of gate drive transistor 60, and is subsequently kept energized by the steady gate current supplied by resistor 71 as long as transistor 60 is held in conduction by transistor 55. This assures full balance conduction of Triac 63 regardless of voltage transients which may be produced by the varying inductive load of motor 10 that, otherwise, might create alternation imbalance by self-commutation at times other than current zero crossings conducted from power source 13. Protection diode 73 prevents positive voltage from being coupled to the collector of gate drive transistor 60 from line 19.

When the stator 11 of the single phase induction motor 10 is connected to the Triac 63 as shown in the drawings, and power from AC source 13 is applied to said Triac, there will be a maximum DC control voltage appearing on line 16 due to the fact that stator current has not been previously providing inrush current pulses at a 120 Hz rate to demodulator 17. This high DC voltage on line 16 causes transistor 55 to conduct without delay after each voltage zero crossing, thereby causing gate drive transistor 60 to energize Triac 63 into conduction without delay. Since this operation is continuous, Triac 63 will pass current in both directions, and the stator winding 11 of motor 10 will receive full waves of 60 cycles causing the rotor 12 thereof to commence rotation.

As motor 10 accelerates with full sine waves of power applied, the pulse parameter modulation output of bridge 24, produced by the load-responsive characteristics of stator 11 inrush current at current zero crossings, begins altering the conduction of transistor 40 in accordance with the previous adjustment of demodulator 17. Above about 95% of synchronous speed, transistor 40, therefore, operates to reduce the DC control voltage which is produced across capacitor 39 in proportion to the mechanical load on the motor, with the result that capacitor 48 does not have sufficient time to receive a full charge before it is discharged periodically by transistor 52 when the motor load is less than the motor's maximum rating. Consequently, at said lesser loads the voltage across capacitor 48 is not sufficiently high at the beginning of each voltage alternation of power source 13 to immediately reach the conduction threshold of transistor 55, and to start operation of gate drive transistor 60. The result is that Triac 63 does not start conducting at the beginning of the voltage cycle from AC power source 13, but begins conduction later, i.e., at a time subsequent to the commencement of the sine wave voltage cycle from power source 13.

Triac 63 breaks off conduction when the current passing through it drops near zero. This occurs slightly after the voltage wave passes through zero, due to the inductance of stator winding 11 delaying the current wave. The energy which is actually delivered to the motor stator 11 by Triac 63 when the motor is running with zero load accordingly represents only a very small part of the sine wave from AC power source 13, e.g., typically less than 3 milliseconds of each 8.33 millisecond alternation period when power source 13 operates at a frequency of 60 Hz per second.

As the motor load increases above zero load, the stator current inrush current induced pulse parameter modulation output of bridge 24 becomes indicative of a reduced motor efficiency due to inadequate stator excitation, and this condition proportionally decreases the pulse width (designated time "b" in FIG. 2) at the collector of transistor 34. This, in turn, results in a proportionate increase in the magnitude of the DC control voltage charging capacitor 48, thereby enabling transistor 55 to reach its conduction threshold sooner and starting the conduction of Triac 63 nearer the beginning of the power cycle, whereby more power reaches the stator of motor 10.

Line 135 of FIG. 4 is a graphical representation of stator rms input current typical of a 1 HP, single phase induction motor when connected directly to a sine wave power source of 120 VAC at 60 Hz per second. Line 136 of FIG. 4 illustrates said stator rms current when said motor has its input power (from the same source) controlled in accordance with the present invention. Line 136 shows the substantial reduction in stator input current at rotor loads of less than 50% of load rating and further, the significant improvement in linearity between input current and imposed motor loads at any given moment achieved by the present invention. In actual operation on a four-pole, 60 Hz, 1 HP motor, input power is typically reduced by over 90% at zero load and by approximately 2% at maximum rated load, and full sine waves of power are supplied below about 95% of synchronous speed during motor starting or moments of overload. Motor speed regulation is also improved, being typically less than 2% from zero to maximum rated load. Moreover, the power factor of the motor, as seen by the power source, is substantially improved. This is because the motor reflects minimum reactance to said power source throughout its rated load range when rms input power is coupled in the form of partial sine waves as a function of momentary motor efficiency rather than being supplied full power regardless of load or efficiency as is the prior art practice. This substantial reduction in nonproductive reactive current flow provides additional energy saving by sharply reducing the $I^2R$ loss in the power lines between said motor and said power source at light to moderate loads.

When the load on the motor decreases, the pulse parameter modulation at the output of bridge 24 becomes indicative of reduced motor efficiency due to excessive stator excitation, and this decreases the operative angle of the AC wave and decreases the power which is supplied to the motor.

Thus, due to the closed loop feedback referenced to motor operating efficiency that becomes controllingly operative near synchronous speed and which includes a rotor mechanical load, when present, the inherent electro-mechanical properties of the controlled motor serve to increase or decrease the input power coupled from AC power source 13 as necessary to maintain energy-efficient operation with all loads between zero and maximum rated motor load and/or variations in the magnitude of the source voltage supplied by the AC power source.

While I have thus described preferred embodiments of the present invention, many variations will be apparent to those skilled in the art. By way of example, means other than a transformer 20 whose primary is connected physically in series with one of the input power leads to motor 10 can be used to monitor the stator inrush current at zero crossings. Specifically, a magnetically coupled instrument-type current transformer (such as is commonly employed with wattmeters used for motor input power measurements) could be used to couple the load-related stator inrush current parameter modulation to a transformer 20 located within demodulator 17. It must therefore be understood that the foregoing description is intended to be illustrative only and not limitative of the present invention, and all such variations and modifications as are in accordance with the principles described are meant to fall within the scope of the appended claims.

Having this described my invention, I claim:

1. In an energy economizing AC power control system operative to reduce the iron and copper losses in a conventional AC induction motor having a stator winding and a rotor adapted to be coupled to a load, said system being of the type comprising a sine wave power source for energizing said stator winding to effect rotation of said rotor, and a nonlinear closed loop positive feedback control means conditionally operative to control the form and magnitude of energization of said stator winding from said power source, said feedback control means comprising motor load detecting means for producing a control signal which varies as a function of the load of said motor, wave modifier means responsive to said control signal, and switching means disposed between said sine wave power source and said stator winding, the conduction time of said switching means being controllable during each cycle of said power source as a function of said control signal to apply full sine waves of voltage from said power source to said stator winding during rotational start-up and speed build-up of said motor and, as said motor reaches a near synchronous speed, then being operative to provide varying fractions or complete cycles of each sine wave of voltage from said power source to said stator winding in accordance with the inherent electro-mechanical properties of said motor and the energy requirements imposed on said motor by the rotor load at any given moment, the improvement wherein said motor load detecting means comprises a motor current demodulator circuit coupled to said stator winding and jointly responsive to at least two load-related variations of the parameters of the inrush current to said stator winding each time the current in said stator winding increases from zero for producing said variations of said control signal, said parameters including the magnitude of the stator inrush current at the beginning of each current alteration and also including the instantaneous phase of said stator inrush current.

2. The control power system of claim 1 wherein said motor current demodulator circuit is also operative to monitor the rise time of the stator inrush current at the beginning of each current alternation.

3. The power control system of claim 1 wherein said motor current demodulator includes means for adjusting said demodulator to cause it to respond to a resultant signal produced by a particular combination of the inrush current parameters thereby to provide a control signal that varies in proportion to mechanical load variations coupled to said rotor.

4. The power control system of claim 1 wherein said motor current demodulator circuit includes means operative in response to sudden variations of a particular parameter of said inrush current above a predetermined value, resulting from a sudden increase in the magnitude of the load coupled to said rotor, for accelerating the coupling of increased input power to said stator.

5. The power control system of claim 1 wherein said motor current demodulator circuit is magnetically coupled to one of the power input lines to said stator winding.

6. The power control system of claim 5 wherein said magnetic coupling is effected by a transformer having a primary winding which is connected to said one of the power input lines to said stator winding, said transformer having a secondary winding which is connected to said motor current demodulator circuit, and said transformer including a core that saturates at a substantially lesser current magnitude than that which flows through said stator winding when said induction motor operates with maximum efficiency at zero load.

7. The power control system of claim 1 wherein said motor current demodulator circuit includes means for producing a voltage pulse of predetermined polarity in response to each stator current zero crossing, transistor means, means responsive to said voltage pulses for providing a motor load related first bias of predetermined sense to said transistor means, and means responsive to the alternations of said power source for providing a second bias of opposite sense to said transistor means, the conduction of said transistor means being jointly responsive to said first and second biases and being operative to produce output pulses whose width varies as a function of the load on said motor.

8. The power control system of claim 7 wherein said motor current demodulator includes adjustment means for opposing nonlinearity in the parameters of said voltage pulses induced by said power source during each alternation of said power source voltage.

9. The power control system of claim 7 including means responsive to the widths of said output pulses for controlling the magnitude of said control signal, whereby the magnitude of said control signal varies as a function of the load on said motor.

10. The power control system of claim 9 wherein said last-named means includes further transistor means whose conduction is controlled by said varying width output pulses, capacitor means, and a charging circuit for said capacitor means which includes said further transistor means, the charge on said capacitor means providing said control signal.

11. The power control system of claim 10 wherein said further transistor means comprises AC signal-biased DC amplifier means.

12. The power control system of claim 10 wherein said charging circuit includes means operative to generate a DC potential across said capacitor means whose magnitude is inversely proportional to the widths of said output pulses.

13. The power control system of claim 7 including transformer means for coupling said motor current demodulator circuit to one of the power input lines to said stator winding, said means for producing a voltage pulse of predetermined polarity in response to each stator current zero crossing comprising full-wave rectifier means connected to the secondary winding of said transformer means.

14. The power control system of claim 13 wherein said transformer means comprises a saturable core transformer.

15. An energy economizing AC power control system operative to reduce the iron and copper losses in a conventional induction motor, comprising a conventional AC induction motor having a stator winding and a rotor adapted to be coupled to a load, a sine wave power source for energizing said stator winding to effect rotation of said rotor, and a nonlinear closed loop positive feedback control means conditionally operative to control the form and magnitude of energization of said stator winding from said power source, said feedback control means comprising motor efficiency monitoring means for producing a control signal which varies as a function of the operating efficiency of said motor, wave modifier means responsive to said control signal, and switching means disposed between said sine wave power source and said stator winding, the conduction time of said switching means being controllable during each cycle from said power source as a function of said control signal to apply full sine waves of voltage from said power source to said stator winding during rotational start-up and speed build-up of said motor and, as said motor reaches a particular condition of operating efficiency, then being operative to provide varying fractions of each sine wave of voltage from said power source to said stator winding in accordance with the inherent electromechanical properties of said motor and the energy requirements imposed on said motor by the rotor load at any given moment, said motor efficiency monitoring means comprising a motor current demodulator circuit coupled to said stator winding and having means therein operative to monitor the instantaneous phase and the magnitude of the inrush currrent to said stator winding each time the current in said stator winding increases from zero, and including further circuit means operative to oppose nonlinearity of said stator inrush current resulting from the voltage wave form of said sine wave power source.

16. The power control system of claim 15 wherein said wave modifier means includes a Triac assembly having its input coupled to said sine wave power source and its output connected to said stator winding, and a control circuit coupled to the control terminal of said Triac assembly and responsive to the magnitude of said DC control voltage for controlling the conductivity of said Traic assembly during each cycle of said sine wave power source.

17. The power control system of claim 16 wherein said control circuit comprises a gate trigger generator responsive to said DC control voltage for selectively producing a fast-rising voltage pulse, amplifier means for converting said voltage pulse to a fast-rising current pulse, and circuit means for coupling said current pulse to said control terminal of said Triac assembly.

18. The power control system of claim 17 including capacitor means coupling the output of said amplifier means to the input of said gate trigger generator to accelerate the turning on of said gate trigger generator.

19. The power control system of claim 18 wherein said gate trigger generator includes input circuit means responsive to the amplitude of said control signal for controlling the time at which said fast-rising current pulse is produced by said amplifier means in respect to the beginning of each cycle of said sine wave power source, whereby said gate trigger generator functions as a Triac trigger delay switch operative to control the time at which said Triac assembly is rendered conductive in relation to the beginning of each voltage cycle of said sine wave power source.

20. The power control system of claim 15 wherein said motor current demodulator circuit is also operative to monitor the rise time of the stator inrush current at the beginning of each current alternation.

21. The power control system of claim 15 wherein said motor current demodulator circuit includes means operative to develop a system control signal in response to the torque-responsive magnitude of said inrush current and the particular time of occurrence of said inrush current compared to voltage zero crossings of said sine wave power source, thereby to control the energization of said stator winding as a function of the efficiency with which said motor converts electrical energy to mechanical energy during each cycle of said sine wave power source.

22. The power control system of claim 21 wherein said motor current demodulator includes circuit means for cancelling particular inrush current nonlinearity that is not a direct function of motor operating efficiency.

23. The power control system of claim 21 wherein said motor current demodulator circuit includes means responsive to magnitude increases in said stator inrush current above a particular magnitude for overriding the motor operating efficiency system control and for substituting therefor, for a selected time, a control signal proportional to the magnitude of a severe mechanical load suddenly applied to said rotor.

24. The power control system of claim 15 wherein said motor current demodulator circuit is magnetically coupled to one of the power input lines to said stator winding.

25. The power control system of claim 24 wherein said magnetic coupling is effected by a transformer having a primary winding which is connected to said one of the power input lines to said stator winding, said transformer having a secondary winding which is connected to said motor current demodulator circuit, and said transformer including a core that saturates at a substantially lesser current magnitude than that which flows through said stator winding when said induction motor operates with maximum efficiency at zero load.

26. The power control system of claim 15 wherein said motor current demodulator circuit includes means for producing a voltage pulse of predetermined polarity in response to each stator current zero crossing, transistor means, means responsive to said voltage pulses for providing a first bias of predetermined sense to said transistor means, and means responsive to the alternations of said power source for providing a second bias of opposite sense to said transistor means, the conduction of said transistor means being jointly responsive to said first and second biases and being operative to produce output pulses whose width varies as a function of the efficiency with which said motor converts electrical energy to mechanical energy.

27. The power control system of claim 26 including means responsive to the widths of said output pulses for controlling the magnitude of said control signal, whereby the magnitude of said control signal varies as a function of the operating efficiency of said motor.

28. The power control system of claim 27 wherein said last-named means includes further transistor means whose conduction is controlled by said varying width output pulses, capacitor means, and a charging circuit for said capacitor means which includes said further transistor means, the charge on said capacitor means providing said control signal.

29. The power control system of claim 28 wherein said charging circuit includes means operative to generate a DC potential across said capacitor means whose magnitude is inversely proportional to the widths of said output pulses.

30. The power control system of claim 26 including transfomer means for coupling said motor current demodulator circuit to one of the power input lines to said stator winding, said means for producing a voltage pulse of predetermined polarity in response to each stator current zero crossing comprising full-wave rectifier means connected to the secondary winding of said transformer means.

31. The power control system of claim 30 wherein said transformer means comprises a saturable core transformer.

32. The power control system of claim 15 wherein said system includes means responsive to variations in the magnitude of the voltage of said power source above or below the nominal rated output voltage of said power source for causing said conditionally operative feedback means to maintain the maximum possible operating efficiency of said motor regardless of said power source voltage variations.

33. The power control system of claim 32 wherein said efficiency monitoring means includes means responsive to a decrease in motor operating efficiency as determined by comparison of the inrush current parameters with a particular set of inrush current parameters previously established as a particular operating efficiency reference, for controlling the fraction of each sine wave of voltage coupled from said power source to said stator winding.

34. A power control system comprising an AC induction motor having a rotor and a stator winding, a sine wave power supply for energizing said stator winding to effect rotation of said rotor, a motor current demodulator circuit coupled to said stator winding for monitoring at least two different operating efficiency-related parameters of the inrush current to said stator winding each time the current in said stator winding increases from zero, said demodulator circuit including means operative to generate an output control signal whose magnitude is jointly dependent upon said efficiency-related inrush current parameters, and control means responsive to said output control signal from said motor current demodulator circuit for controlling the energization which is supplied by said power supply to said stator winding.

35. The power control system of claim 34 wherein said control means is operative to vary the portion of each sine wave which is coupled to said stator winding from said power supply.

36. The power control system of claim 35 wherein one of said two different parameters is the time of occurrence of said stator inrush current as compared to the voltage zero crossing of said sine wave power supply.

37. The power control system of claim 36 wherein another of said two different parameters is the rotor-load dependent magnitude of said stator inrush current.

* * * * *